(12) United States Patent
Zenanko (10) Patent No.: US 9,408,378 B2
(45) Date of Patent: Aug. 9, 2016

(54) FISH FINDER DEVICE HOUSING AND SYSTEM

(71) Applicant: Vexilar, Inc., Minneapolis, MN (US)

(72) Inventor: Tom Zenanko, Shakopee, MN (US)

(73) Assignee: Vexilar, Inc., Minneapolis, MN (US)

( * ) Notice: Subject to any disclaimer, the term of this patent is extended or adjusted under 35 U.S.C. 154(b) by 190 days.

(21) Appl. No.: 14/291,247

(22) Filed: May 30, 2014

(65) Prior Publication Data

US 2015/0346339 A1 Dec. 3, 2015

(51) Int. Cl.
*A01K 93/00* (2006.01)
*A01K 91/06* (2006.01)
*A01K 99/00* (2006.01)
*A01K 97/12* (2006.01)
*A01K 97/00* (2006.01)
*B63B 22/24* (2006.01)
*G01S 15/96* (2006.01)
*G01S 7/521* (2006.01)

(52) U.S. Cl.
CPC .................. *A01K 91/06* (2013.01); *A01K 93/00* (2013.01); *A01K 97/00* (2013.01); *A01K 97/125* (2013.01); *A01K 99/00* (2013.01); *B63B 22/24* (2013.01); *G01S 7/521* (2013.01); *G01S 15/96* (2013.01)

(58) Field of Classification Search
CPC ..................... G01S 15/96; A01K 95/00–97/00; A01K 97/12; A01K 97/125; A01K 93/02; A01K 93/00; A01K 99/00; A01K 91/06; B63B 22/24
See application file for complete search history.

(56) References Cited

U.S. PATENT DOCUMENTS

| 807,875 A | 12/1905 | Shinners |
|---|---|---|
| 2,490,669 A | 12/1949 | Burke |
| 2,591,558 A | 4/1952 | Kramer |
| 2,884,734 A | 5/1959 | Binkowski |
| 5,463,597 A | 10/1995 | Harlev |
| 5,495,689 A | 3/1996 | Cassem |

(Continued)

FOREIGN PATENT DOCUMENTS

WO WO 2013/186576 A1 12/2013

OTHER PUBLICATIONS

SmartCast™ Mode Operations Manual, Hummingbird, 12 pages, (prior to May 12, 2014).

(Continued)

*Primary Examiner* — Luke Ratcliffe
*Assistant Examiner* — Hovhannes Baghdasaryan
(74) *Attorney, Agent, or Firm* — Patterson Thuente Pedersen, P.A.

(57) ABSTRACT

A fish finder device housing having a watertight shell housing capable of containing an electronic load having a transducer within an interior space, the housing have oppositely opposed extension members, each of the extension members having a keel, the oppositely opposed extension members and keels helping maintain the fish finder device housing and contained transducer in a stable condition such as in a substantially upright vertical position and preventing the housing from rocking back-and-forth and rolling side-to-side during normal fishing conditions including choppy or wavy water, when an angler is fishing in a body of water having a current, or when the angler is pulling the fish finder device housing behind a watercraft during trolling. The fish finder device housing may have an aperture in at least one of the extension members for connecting a fishing line, such as that of a fishing pole, or a line for tethering the fish finder device housing behind a watercraft.

20 Claims, 4 Drawing Sheets

(56) References Cited

U.S. PATENT DOCUMENTS

| | | | |
|---|---|---|---|
| 5,546,695 | A | 8/1996 | Langer |
| 5,887,376 | A | 3/1999 | Currier et al. |
| 6,122,852 | A | 9/2000 | Mechling, IV |
| 6,693,847 | B2 | 2/2004 | Betts |
| 6,771,562 | B2 | 8/2004 | Betts et al. |
| 7,554,884 | B2 | 6/2009 | Park |
| 2004/0105343 | A1* | 6/2004 | Betts .................. A01K 93/02 367/99 |
| 2006/0216007 | A1* | 9/2006 | Moreb ................. A01K 97/00 396/25 |
| 2007/0203465 | A1* | 8/2007 | Salvadori ............ A61F 5/4405 604/323 |
| 2014/0057677 | A1 | 2/2014 | Liubinas et al. |

OTHER PUBLICATIONS

Deeper Smart Fish Finder for iOS and Android Devices, 11 pages, (prior to May 12, 2014).

Geeky Gadgets, ReelSonar Fishfinder App and Smart Bobber Helps You Outsmart the Fish (video), 6 pages, (prior to May 12, 2014).

Buy Cheap Portable Wireless Sonar Fishing Fish Finder Fishfinder, 4 pages, (prior to May 12, 2014).

4 Levels Grauscale Wireless Fish Finder FF168W—Phiradar (China Manufacturer)—Products, 7 pages, (prior to May 12, 2014).

European Search Report for European Application No. 15169760.4, dated Oct. 21, 2015.

* cited by examiner

FISH FINDER DEVICE HOUSING AND SYSTEM

FIELD OF THE INVENTION

The present invention relates generally to a fish finding device housing, and particularly to a buoyant fish finding device housing that is capable of housing a portable fish finding device that is compatible with a personal communication device, such as a smart phone, tablet computer or other device having a display.

BACKGROUND OF THE INVENTION

Sonar systems have long been used by anglers to gauge conditions in a given fishing location, such as the depth of the body of water being fished, as well as the presence and depth of fish (commonly referred to as a "depth finder" or a "fish finder"). Sonar systems use a transducer (e.g., electroacoustic transducer) to generate a sonar pulse that is directed down through the water. The transducer receives a sonar echo return from the bottom of the body of water, as well as sonar returns from fish or other objects in the water and located within the transducer's sonar cone. The depth (or distance) and size of solid objects (e.g., fish, lure, bottom of the body of water, etc.) are then estimated based upon the speed and intensity of the echo return waves relative to the original sonar pulse. The estimated information is then signaled to a display.

Sonar based fish finders have been devised for use by fishermen from a river bank or a shore. Exemplary of these are those shown and described in U.S. Pat. Nos. 5,463,597; 5,495,689; 5,546,695; 5,887,376 and 6,122,852. These fish finder systems typically consist of a float or buoy that supports a sonar, with the float tethered to a fishing pole. A transmission line extends from the float to a display screen that is located beside the shore based fisherman. With this system, a fisherman is able to see sonar returns from fish and the immediate bottom terrain received and relayed from the buoy while standing on the bank of the body of water. The buoy may be located over the angler's baited hook or even be on the fishing line itself. These tethered systems have many limitations, including the requirement of a tethered transducer to a display.

Recently, portable fish finder devices for use by an angler have been devised. Examplary of these are U.S. Pat. Nos. 6,693,847; 6,771,562 and 7,554,884. These portable fish finder devices are contained within a buoyant housing. With this system, the load housed within the housing includes sonar operatively linked by a microprocessor with a radio transmitter. These housings, however, have shortcomings when used during fishing, such as in rough or choppy water where the transducer is continuously rocked from side-to-side as the device is bobbed in an up-and-down direction within the water. Further, these housings are not conducive to having the load maintained in a vertical position in a body of water where there is a water-current or the buoyant housing is moved through the body of water, such as when an angler is trolling, which can be in conditions of a water-current or rough/choppy water. In each of these situations, the housing does not adequately maintain the transducer in a desired vertical position, which is desired to maintain a connection with the sonar display and provide accurate sonar data, which is then provided to the angler on a display.

In light of the above, a need exists for a housing for a fish finding device that is capable of maintaining the transducer in a vertical position to provide a desired connection and provide accurate sonar data when the fish finder is used in typical fishing water conditions, such as choppy and/or wavy water, water-current, or the fish finder being moved through a body of water during an activity such as trolling.

SUMMARY OF THE INVENTION

The present invention is directed at a housing for a fish finder device. In some aspects, the housing has an upper shell operably connected to a lower shell providing a watertight shell housing, the watertight shell housing defining an interior area for containing an electronic load having a transducer. In some aspects, the upper shell and the lower shell have a body portion, with a first extension member and a second extension member extending away from the body portion of the upper shell and/or the lower shell, wherein the first and second extension members are proximately connected to opposing sides of the respective body portion and extending away from the respective body portion, and wherein the first and second extension members have a top surface and a bottom surface. The housing also has a first keel located on the bottom surface of the first extension member and/or a second keel located on the bottom surface of the second extension member, wherein the first and second keels are substantially located in the same vertical plane. In some aspects, the vertical plane also bisects a center point located in the interior area of the housing.

In some aspects of the present invention, the first extension member extends further away from the body portion than the second extension member.

In some aspects of the present invention, the first keel is longer than the second keel. In some aspects, the first keel is more than about twice as long as the second keel.

The first keel and second keel each have a length in the vertical plane that defines a depth of the respective keel. In some aspects of the present invention, the depth of the first keel is greater than the depth of the second keel, such that the first keel extends away from the bottom surface to have a depth that is greater than the second keel. In some aspects, the depth of the first keel is about twice as long as the second keel, while in other aspects the depth of the first keel is more than about twice than that of the second keel.

In some aspects, the first and second keels have a general fin-shaped configuration. In some aspects, the deepest portion of the fin-shaped configuration of the first keel is located the furthest away from the body portion, while the deepest portion of the fin-shaped configuration of the second keel is located closest to the body portion. In some aspects, there is a gap of at least ⅛ inches to about ½ inch between the keels and the body portion. In some aspects, the keels stop about ⅛ inches to about ½ inch from the distal end of the respective extension member.

In some aspects, the first and second keels have a thickness of about 1/16 inch to about ¼ inches, preferably about 1/16 inch to about 3/16 inches.

In some aspects of the present invention, at least one of the top surfaces of the first and second extension members has a generally convex-shaped configuration, while in other aspects both the first and second extension members have a top surface that has a generally convex-shaped configuration.

In some aspects of the present invention, at least one of the first and second extension members has a bottom perimeter portion that extends in a vertical direction away from the bottom surface at least around a portion of the at least one of the first and second extension members. In some aspects, the first and second extension members both have a bottom perimeter portion that extends in a vertical direction away from the bottom surface. In some aspects, the bottom surfaces and the bottom perimeter portions of the first and second extension members define a substantially concave-shaped configuration on the underside portion of the extension members.

In some aspects of the present invention, the lower shell has a substantially flat bottom surface. In some aspects, the substantially flat bottom surface corresponds to the transducer housed within the fish finder device housing of the present invention In some other aspects, the substantially flat bottom surface allows the housing to sit on a surface without rolling.

In some aspects of the present invention, the upper shell has a protruding portion extending away from the body portion. In some aspects, the protruding portion has a substantially cylindrical shape with a rounded top surface. In some aspects, a light may be housed within the housing corresponding to the protruding portion, the housing allowing the light to shine through the material of the housing and/or allowing the housing to glow.

In some aspects of the present invention, the first extension member has an aperture. In some aspects of the present invention, the first extension member and/or the second extension member have an aperture. In some aspects, the aperture is located between the first keel and a distal end of the first extension member. In some aspects, the aperture is located between the second keel and a distal end of the second extension member. In some aspects, the aperture is located on the second extension member during normal use, such that the first extension member and first keel are in a trailing position relative to the second extension member and second keel that are in a leading position.

In some aspects of the present invention, the upper and lower shells have a sealing gasket located there between.

In some aspects of the present invention, the watertight shell housing is about 2 to about 3½ inches in diameter, the first extension member is about 1 inch to about 2½ inches in length, the first extension member is about 1 inch to about 1¾ inches in width where it proximately connects to the upper shell and about ⅜ inches to about 1 inch wide at the distal end, the second extension member is about ½ inch to about 1½ inches in length, the second extension member is about ¾ inches to about 1¼ in width where it proximately connects to the upper shell and about ⅜ inches to about 1 inch wide at the distal end, the first keel has a longitudinal length of about 1 inch to about 2 inches, the first keel has a depth of about ½ inch to about 1 inch, the second keel has a length of about ⅜ inches to about 1¼ inches, the second keel has a depth of about 3/16 inches to about ¾ inches, the protruding portion protrudes about ¼ inches to about ¾ inches from the upper shell, the protruding portion is about ½ inch to about 1 inch in diameter, and/or the bottom flat surface of the lower shell is about ¾ inches to about 1¾ inches in diameter.

In some aspects of the present invention, the fish finder device housing is capable of containing an electronic load having a transducer, the housing having an upper shell operably connected to a lower shell providing a watertight shell housing. In some aspects, the upper shell having a body portion, a first extension member, and a second extension member, wherein the first and second extension members are proximately connected to opposing sides of the body portion and extending away from the body portion and having a distal end, and wherein the first and second extension members have a top surface and a bottom surface. In some aspects, the housing has a first keel located on the bottom surface of the first extension member, the first keel having a first length and a first depth, and/or a second keel located on the bottom surface of the second extension member, the second keel having a second length and a second depth. In some aspects, the first length of the first keel is greater than the second length of the second keel.

In some aspects of the present invention, the fish finder device housing is capable of containing an electronic load having a transducer, the housing having an upper shell operably connected to a lower shell providing a watertight shell housing, the upper shell having a body portion, a first extension member, and a second extension member, wherein the first and second extension members are proximately connected to opposing sides of the body portion and extending away from the body portion and having a distal end, and wherein the first and second extension members have a top surface and a bottom surface. In some aspects, the housing has a first keel located on the bottom surface of the first extension member, the first keel having a first length and a first depth, and/or a second keel located on the bottom surface of the second extension member, the second keel having a second length and a second depth. In some aspects, the first depth of the first keel is greater than the second depth of the second keel.

In some aspects of the present invention, the fish finder device housing can be tracked behind a watercraft at a speed up to about 5 miles-per-hour without losing stability and maintain proper connection and good signal. In some aspects, the fish finder device housing is tracked behind a watercraft with a line tethered to an aperture of the second extension member, whereby during the tracking the second extension member and the second keel traverses a body of water with the first extension member and the first keel trailing the second extension member through the body of water.

In some aspects of the present invention, the first and second extension members help maintain a transducer within the housing in a stable position that is within a 10 degree conical radius to the surface of the water, the first and second extension members helping prevent a back-and-forth rocking of the housing. In some aspects of the present invention, the first and second keels maintain a transducer within the housing in a stable position that is within a 10 degree conical radius to the surface of the water, the first and second keels helping prevent a side-to-side rolling of the housing.

DETAILED DESCRIPTION OF THE DRAWINGS

Referring generally to FIGS. 1-8, a housing 10 for a fish finder device is provided. The housing 10 comprises an upper shell 20 operably connected to a lower shell 30 providing a watertight shell housing. In some aspects, the watertight shell housing has a generally bulbous configuration. In other aspects, the watertight shell may comprise other geometric shapes, such as oval or football-shaped, rectangular, cylindrical with rounded edges, and the like. In some aspects, the housing 10 has a generally sphere shape, such that upper shell 20 and the lower shell 30 have about the same vertical and horizontal diameters. The housing 10 may comprise a plastic material.

In some aspects, the housing is generally spherical with the upper shell 20 having a radius of about ¾ inches to about 1¾ inches, preferably about 1¼ inch. In some aspects, the lower shell 30 has a radius of about ¾ inches to about 1¾ inches, preferably about 1¼ inch.

In some other aspects, the upper shell 20 and the lower shell 30 have different radius sizes, such that either the upper shell 20 or the lower shell 30 is larger than the other. In some aspects, the housing 10 has means for operably connecting the upper shell 20 and the lower shell 30 to form the watertight shell housing, such as by threads on the respective shells 20, 30, a sealing gasket, or the upper and lower shells 20, 30 being pressed together and sealed with a sealant. One of ordinary skill in the art will appreciate that there are various methods and means of operably connecting the two shells 20, 30 together to form the watertight shell housing.

In some aspects, the watertight shell housing 10 has a diameter of about 1½ inches to about 3½ inches, preferably about 2 inches to about 2¼ inches, more preferably about 2¼ inches to about 2½ inches, without taking into consideration the height of a protruding portion 21 of the upper housing 20. When taking into consideration the height of the protruding portion 21, the watertight shell housing 10 has a height of about 2¾ inches to about 3¾ inches, preferably about 3 inches to about 3½ inches, more preferably about 3¼ inches.

The upper shell 20 operably connected to the lower shell 30 defines an interior area (not shown) for containing an electronic load having a transducer, such as the electronic load disclosed in U.S. Patent Publication No. 2014/0057677 A1, the disclosure of which is incorporated by reference in its entirety herein. In some aspects, a center of gravity is located within the interior area of the housing 10. In some aspects, the housing 10 floats approximately half-way in the water when containing the electronic load. In some aspects, the electronic load may include a light source and the housing 10 may comprise a material that allows at least a portion of the housing 10 to glow from the light source within the housing 10.

As shown in FIGS. 1-8, the upper shell 20 comprises a body portion 22 with a first extension member 24 proximately connected to the body portion 22 and extending away from the body portion 22 and a second extension member 26 proximately connected to the body portion 22 and extending away from the body portion 22, such that the first extension member 24 has a distal end 24a and the second extension member 26 has a distal end 26a. In some aspects, the first extension member 24 and/or the second extension member 26 are integral with the body portion 22. In some aspects, the first and second extension members 24, 26 are proximately connected to opposing sides of the body portion 22 and extending away from the body portion 22 such that the respective distal ends 24a, 26a of the first and second extension members 24, 26 are substantially in the same horizontal and/or vertical plane. In some aspects, the horizontal and/or vertical plane also bisects a center point located within the interior area of the housing 10.

One of ordinary skill in the art will appreciate that the first and second extension members 24, 26 may alternatively be connected to a body portion 32 of the lower shell 30 without departing from the scope and spirit of the present invention. For example, in some alternative aspects, the lower shell 30 comprises a body portion 32 with the first and second extension members 24, 26 proximately connected proximately connected to the body portion 32 and extending away from the body portion 32, such that the first extension member 24 has a distal end 24a and the second extension member 26 has a distal end 26a. In some aspects, the first extension member 24 and/or the second extension member 26 are integral with the body portion 32. In some aspects, the first and second extension members 24, 26 are proximately connected to opposing sides of the body portion 32 and extending away from the body portion 32 such that the respective distal ends 24a, 26a of the first and second extension members 24, 26 are substantially in the same horizontal and/or vertical plane. In some aspects, the horizontal and/or vertical plane also bisects a center point located within the interior area of the housing 10.

As shown in FIGS. 1-8, the first extension member 24 has a top surface 24b and a bottom surface 24c, and the second extension member 26 has a top surface 26b and a bottom surface 26c. In some aspects, the first extension member 24 is larger in size than the second extension member 26. During use in a body of water, the first and second extension members 24, 26 help prevent the housing 10 from rocking forward-and-backward in the body of water and help maintain a consistent transducer location with respect to the surface of the body of water.

In some aspects, the housing 10 has a first keel 25 located on the bottom surface 24c of the first extension member 24. In some aspects, the housing has a second keel 27 located on the bottom surface 26c of the second extension member 26. In some aspects, the first and second keels 25, 27 extend away from the respective bottom surfaces 24c, 26c such that they are substantially located in the same vertical plane. In some aspects, the first and second keels 25, 27 are substantially located in the same vertical plane that also bisects the center point of the housing 10. In some aspects, the first keel 25 is larger in size than the second keel 27, which may help prevent the housing 10 from tilting when being pulled behind a watercraft of used in a body of water having a current.

During use in a body of water, the first and second keels 25, 27 help prevent the housing 10 from rolling side-to-side in a body of water. The first and second keels 25, 27 and first and second extension members 24, 26 thus help maintain the transducer within the housing 10 in a consistent position relative to the surface of the water, which in some aspects is within about a 10 degree conical angle with respect to the surface of the body of water without waves. In some aspects, the substantially bottom flat surface 34 of the housing 10 is maintained within about a 10 degree conical angle during use when the housing comprises first and second keels 25, 27 and first and second extension members 24, 26.

In some aspects of the present invention, the first extension member 24 extends further away from the body portion 22 than the second extension member 26, such that the distal end 24a of the first extension member 24 is located a distance from the closest body portion 22 that is greater than a distance between the distal end 26a of the second extension member 26 and the closest body portion 22.

In some aspects, the first extension member 24 has a length of about 1 inch to about 2½ inches from the closest body portion 22, preferably about 1¼ inches to about 2¼ inches, more preferably about 1½ inches to about 2 inches. In some aspects, the second extension member 26 has a length of about ½ inch to about 1½ inches from the closest body portion 22, preferably about ¾ inches to about 1¼ inches, more preferably about ⅞ inches to about 1⅛ inch. In some aspects, the first and second extension members 24, 26 have about the same length.

In some aspects, the first extension member 24 is about 1 inch to about 2 inches in width where it proximately connects to the body portion 22, 32, preferably about 1¼ to about 1¾ inches, and more preferably about 1⅜ inches to about 1⅝ inches. In some aspects, the first extension member 24 is about ⅜ inches to about 1 inch in width at the distal end 24a, preferably about ¼ inches to about ¾ inches wide, more preferably about ⅝ inches.

In some aspects, the second extension member 26 is about ½ inch to about 1½ inches in width where it proximately connects to the body portion 22, 32, preferably about ¾ inches to about 1¼ inches, more preferably about ⅞ inches to about 1⅛ inches. In some aspects, the second extension member 26 is about ⅜ inches to about 1 inch in width at the distal end 26a, preferably about ¼ inches to about ¾ inches wide, more preferably about ⅝ inches.

In some aspects, the first and second extension members 24, 26 have about the same width where they proximately connect to the body portion 22, 32 and/or about the same width at the respective distal ends 24a, 26a.

Figure 1:
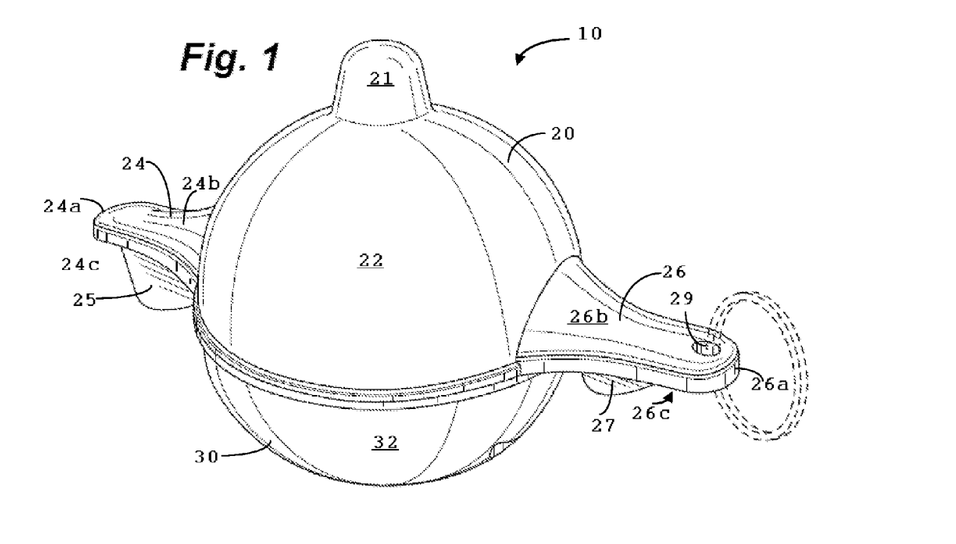
FIG. 1 is a perspective view of a fish finder device housing according to certain aspects of the present invention.
Figure 2:
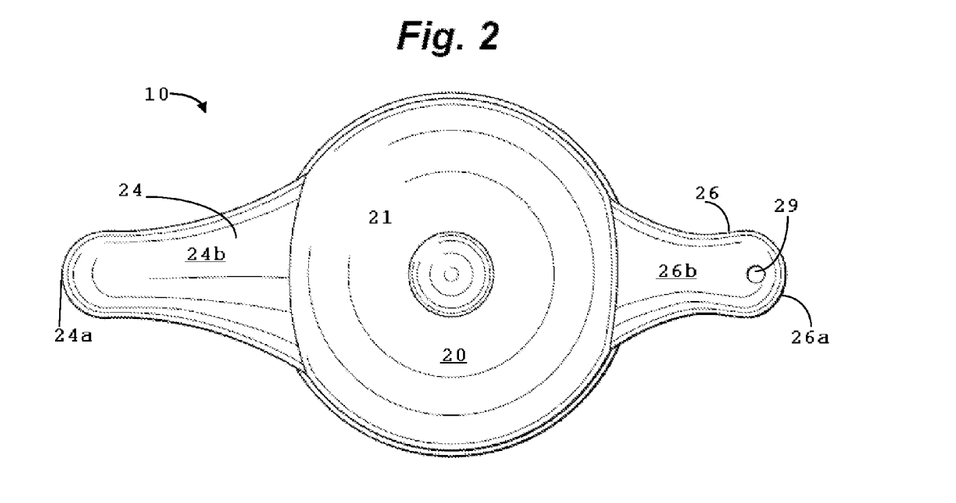
FIG. 2 is a top view of a fish finder device housing according to certain aspects of the present invention.
Figure 3:
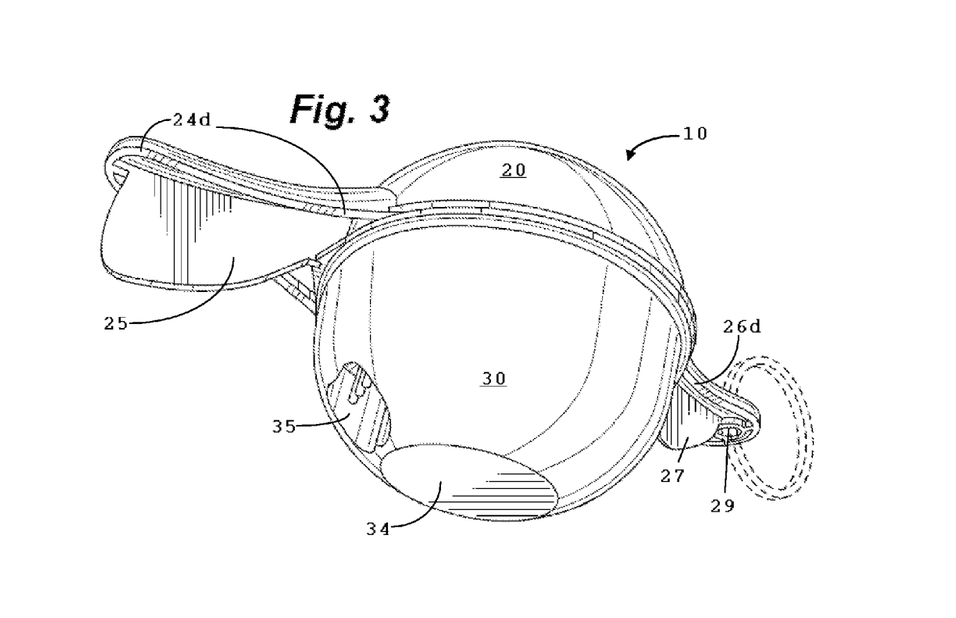
FIG. 3 is a perspective view of a fish finder device housing according to certain aspects of the present invention.
Figure 4:
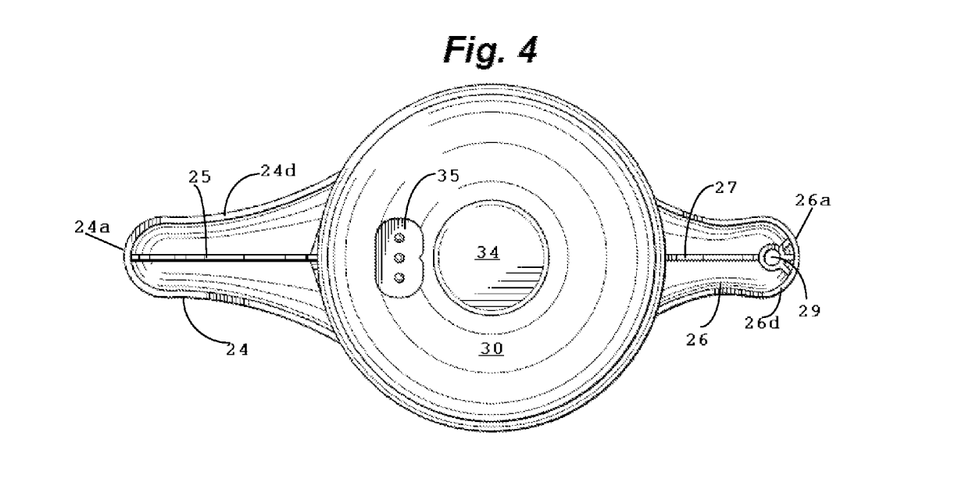
FIG. 4 is a bottom view of a fish finder device housing according to certain aspects of the present invention.
Figure 5:
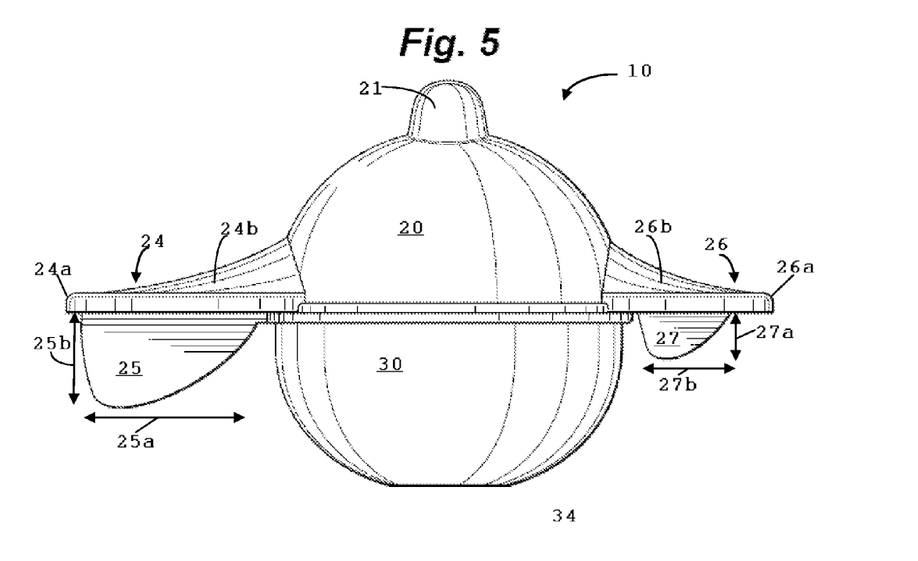
FIG. 5 is side view of a fish finder device housing according to certain aspects of the present invention.
Figure 6:
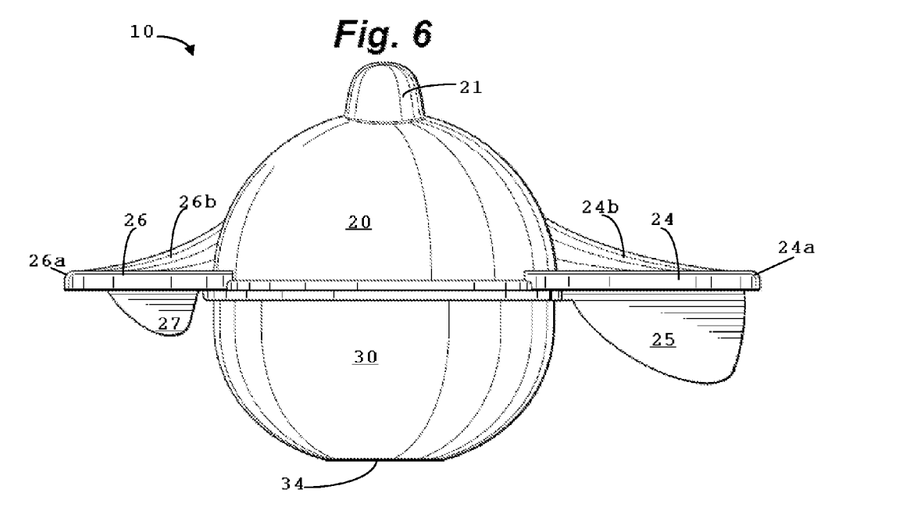
FIG. 6 is a side view of a fish finder device housing according to certain aspects of the present invention.
Figure 7:
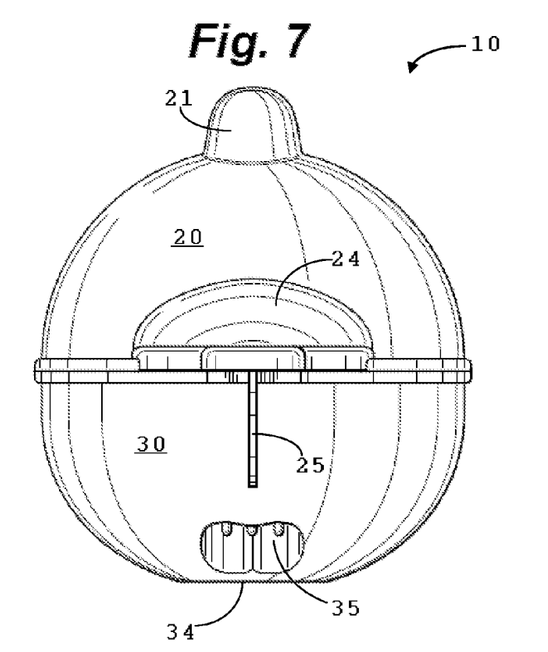
FIG. 7 is an end view of a fish finder device housing according to certain aspects of the present invention.
Figure 8:
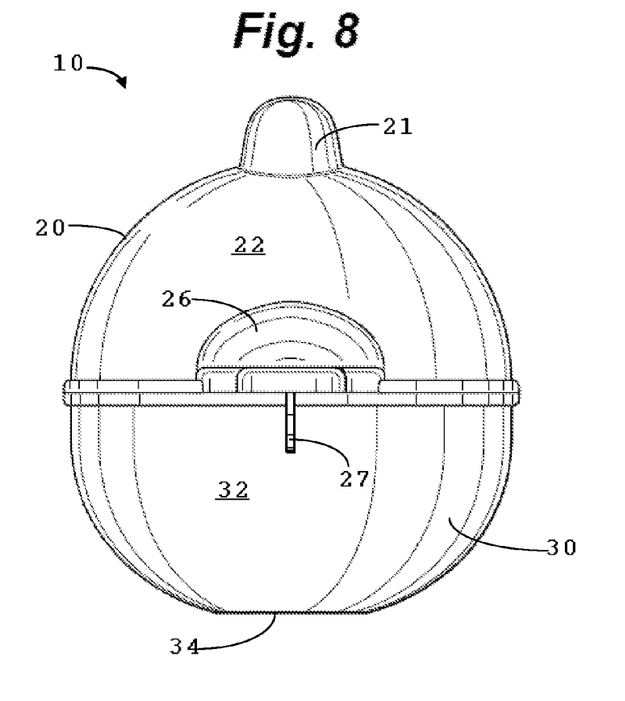
FIG. 8 is an end view of a fish finder device housing according to certain aspects of the present invention.

In some aspects of the present invention, as shown best in FIG. 5, the first keel 25 has a longitudinal length 25a spanning from a first point closest to the body portion 22 to a second point closest to the distal end 24a of the first extension member 24 that is longer than a longitudinal length 27a of the second keel 27, which also spans from a first point closest to the body portion 22 to a second point closest to the distal end 26a of the second extension member 26. In some aspects, the longitudinal length 25a of the first keel 25 is more than about twice as long as the longitudinal length 27a of the second keel 27. In some aspects, the first keel 25 and the second keel 27 have about the same longitudinal length 25a, 27a.

In some aspects, the first keel 25 has a depth 25b that extends away from the bottom surface 24c of the first extension member 24 that is longer than a depth 27b of the second keel 27 that extends away from the bottom surface 26c of the second extension member 26. In some aspects, the depth 25b of the first keel 25 is about twice as long as the depth 27b of the second keel 27. In some other aspects, the depth 25b of the first keel 25 is more than about twice than the depth 27b of the second keel 27. In some other aspects, the depth 25b of the first keel 25 is about the same as the depth 27b of the second keel 27.

In some aspects, the first and second keels 25, 27 have a generally fin-shaped configuration, such that one edge of the first and second keels 25, 27 is longer than the other edge. In some aspects, the deepest portion of the fin-shaped configuration of the first keel 25 is located the furthest away from the body portion 22, 32, while the deepest portion of the fin-shaped configuration of the second keel 27 is located closest to the body portion 22, 32. In some aspects, there is a gap of at least ⅛ inches to about ½ inch between the keels 25, 27 and the body portion 22, 32. In some aspects, the fin-shaped configuration of the first keel 25 and the second keel 27 face the same direction, while in some alternative embodiments, the fin-shaped configuration face opposite directions. In some aspects, the first keel 25 and/or the second keel 27 have a size such that the deepest portion is about a halfway point of the lower shell 30. In some aspects, the first keel 25 and/or the second keel 27 have a size such that the deepest portion is greater than the halfway point of the lower shell 30.

In some aspects of the present invention, the longitudinal length 25a of the first keel 25 is about ⅜ inches to about 2 inches, preferably about ⅞ inches to about 1¾ inches, more preferably about 1 inch to about 1½ inches. In some aspects, the longitudinal length 27a of the second keel 27 is about ⅜ inches to about 2 inches, preferably about ¼ inch to about 1 inch, more preferably about ½ inch to about ¾ inches. In some aspects, the depth 25b of the first keel 25 is about 3/16 inches to about 1½ inches, preferably about ¼ inch to about 1 inch, more preferably about ½ inch to about ¾ inches. In some aspects, the depth 27b of the second keel 27 is about 3/16 inches to about 1½ inches, preferably about ¼ inches to about ⅞ inches, more preferably about ⅜ inches to about ½ inch.

In some aspects of the present invention, at least one of the top surfaces 24b, 26b of the first and second extension members 24, 26 has a convex-shaped configuration proximate the area connected to the body portion 22, 32, while in other aspects both the first and second extension members 24, 26 have a top surface 24b, 26b that has a generally convex-shaped configuration located at least proximate the area connected to the body portion 22, 32.

In some aspects of the present invention, at least one of the first and second extension members 24, 26 has a bottom perimeter portion 24d, 26d that extends in a vertical direction away from the bottom surface 24c, 26c. In some aspects, the first and second extension members 24, 26 both have a bottom perimeter portion 24d, 26d that extends in a vertical direction away from the bottom surface 24c, 26c. In some aspects, the bottom surfaces 24c, 26c and the bottom perimeter portions 24d, 26d of the first and/or second extension members 24, 26 define a substantially concave-shaped configuration on the bottom side portion of the extension members 24, 26.

In some aspects of the present invention, the lower shell 30 has a insert area 35 that allows a protruding electronic portion to extend from the housing 10 to sense the water, such that the transducer is a water-activated transmitter. In some aspects, the insert area 35 allows the protruding electronic portion to be configured for electrical purposes, such as to recharge the one or more batteries of the electronic load between uses.

In some aspects, the lower shell 10 has a substantially flat bottom surface 34. In some aspects, the substantially flat bottom surface 34 has a diameter of about ½ inch to about 2 inches, preferably about 1 inch to about 1½ inches. The substantially flat bottom surface 34 corresponds with the transducer within the housing 10, such that the transducer is maintained approximately parallel with the water surface. In some aspects, the transducer is mounted in the interior area of the housing 10 proximate the substantially flat bottom surface 34. In some aspects, the transducer housed within housing 10 is kept within a conical angle of about 10 degrees with the water surface for the best sonar signal. In some aspects, the substantially flat bottom surface 34 allows the housing 10 to sit on a surface when not being used without rolling around.

In some aspects of the present invention, the upper shell 20 has a protruding portion 21 extending away from the body portion 22. In some aspects, the protruding portion 21 has a substantially cylindrical shape with a rounded top surface. In some aspects, the protruding portion 21 protrudes about ¼ inches to about ¾ inches from the body portion 22 of the upper shell 20, preferably about ½ inch. In some aspects, the protruding portion 21 is about ¼ inches to about ¾ inches in diameter, preferably about ½ inch. In some aspects, the protruding portion 21 is comprised of a material that allows at least a portion of light from a light source contained in the housing 10 from exiting the housing 10. In some aspects, the protruding portion 21 is comprised of a material that allows at least a portion of the housing 10 to glow from a light source within the housing 10, such that a user may locate the housing 10 during inclement weather or darkness.

In some aspects of the present invention, the first extension member 24 has an aperture (not shown). In some aspects of the present invention, the second extension member 26 has an aperture 29. In some aspects, the first extension member 24 and/or the second extension member 26 have an aperture. In some aspects, the aperture is located between the first keel 25 and a distal end 24a of the first extension member 24. In some aspects, as shown in FIGS. 1-4, the aperture 29 is located between the second keel 27 and a distal end 26a of the second extension member 26.

The fish finder device housing 10 of the present invention allows an angler to use portable sonar and displaying the results on a portable display, such as a smart phone, smart tablet or laptop computer. During normal use, an angler may attach a fishing line or other line/rope to the aperture 29 of the housing 10. The housing 10 containing the load may then be cast into a body of water and reeled back to the angler as desired.

Alternatively, the housing 10 may be tethered to an object, such as a dock or a watercraft. In some instances, the housing 10 tethered to a watercraft may be pulled behind the watercraft, for example, trolled behind a fishing boat. Providing the fish finder device within the housing 10 to be trailed behind the watercraft proximate the location of the angler's fishing pole containing the fishing lure, bait, or the like, allows the angler to see the configuration of the body of water and any fish proximate the location of the fishing pole that is also being trolled behind the watercraft.

In some aspects, the aperture 29 is located in the second extension member 26, such that when moved through the water (i.e., reeled in on a fishing pole or tracked behind a watercraft), the first extension member 24 having the first keel 25 trails the second extension member 26 having the second keel 27. In some aspects, the second keel 27 helps keep the housing 10 tracking and preventing or eliminating the housing 10 from spinning when the housing 10 is no longer tracked through a body of water, such as when the user stops reeling the fishing pole or a watercraft slows down or stops.

The fish finder device housing 10 of the present invention having the first and second extension members 24, 26 with the respective first and second keels 25, 27 allows the fish finder device to be maintained in a substantially vertical position to provide a desired connection and provide accurate sonar data when the fish finder is used in typical fishing water conditions, such as choppy and/or wavy water, water-current, or the fish finder being moved through a body of water during an activity such as trolling. In some aspects, the fish finder device housing 10 of the present invention minimizes the transducer contained therein from rocking back-and-forth with respect to the plane containing the first and second extension members 24, 26 and also minimize the housing 10 from rolling side-to-side, such that the transducer within the housing 10 can be substantially maintained within about a 10 degree conical angle with respect to a 360 degree direction of the housing 10 compared to other commercially available fish finder devices contained within housings.

In some aspects, the fish finder device housing 10 allows the fish finder device to be tracked behind a watercraft at a speed of up to at least 5 miles-per-hour without losing stability, as the first and second extension members 24, 26 and first and second keels 25, 27 help maintain the housing 10 in a proper position for a transducer housed therein. In some aspects, the fish finder device contained within the housing 10 of the present invention can be pulled or trolled behind a watercraft at speed between about 0 to about 5 miles-per-hour while maintaining proper tracking and without losing stability, such that proper connection and a good signal can be maintained on the corresponding display.

Though the present invention has been described in preferred embodiments, it should be understood that any additions, modifications or deletions may be made without departing from the spirit and scope of the present invention as set forth in the following claims.

The invention claimed is:

1. A fish finder device housing comprising:
   an upper shell operably connected to a lower shell providing a watertight shell housing, a horizontal plane corresponding to the perimeter where the upper and lower shells are operably connected, the watertight shell housing defining an interior area containing an electronic load having a transducer within the interior area of the watertight shell housing;
   the upper shell having a body portion, a first extension member having a first length, and a second extension member having a second length, wherein the first and second extension members proximately connected to opposing sides of the body portion and extending away from the body portion, and wherein the first and second extension members have a top surface and a bottom surface;
   a first keel located on the bottom surface of the first extension member; and
   a second keel located on the bottom surface of the second extension member;
   wherein the first and second keels are substantially located in a first vertical plane perpendicular to the first horizontal plane.

2. The fish finder device housing of claim 1, wherein the first extension member extends further away from the body portion than the second extension member.

3. The fish finder device housing of claim 2, wherein the first keel has a first longitudinal length at least a substantial portion of the first length of the extension member, the second keel has a second longitudinal length at least a substantial portion of the second length of the second extension member, wherein the first longitudinal length of the first keel is longer than the second longitudinal length of the second keel.

4. The fish finder device housing of claim 2, wherein the first keel has a first longitudinal length at least a substantial portion of the first length of the first extension member, wherein the second keel has a second longitudinal length at least a substantial portion of the second length of the second extension member, and wherein the first longitudinal length of the first keel is more than about twice as long as the second longitudinal length of the second keel.

5. The fish finder device housing of claim 2, wherein the first keel has a first depth extending away from the bottom surface of the first extension member in the first vertical plane that is greater than a second depth of the second keel that is extending away from the bottom surface of the second extension member.

6. The fish finder device housing of claim 2, wherein the first keel has a first depth extending away from the bottom surface of the first extension member in the first vertical plane that is about twice as long as a second depth of the second keel that is extending away from the bottom surface of the second extension member.

7. The fish finder device housing of claim 1, wherein at least one of the top surfaces of the first and second extension members has a convex-shaped configuration.

8. The fish finder device housing of claim 1, wherein the first and second keels have a fin-shaped configuration.

9. The fish finder device housing of claim 8, wherein a first deepest point of the fin-shaped configuration of the first keel is located farther away from the body portion that a second deepest point of the fin-shaped configuration of the second keel.

10. The fish finder device housing of claim 1, wherein at least one of the first and second extension members has a bottom perimeter portion that extends in a vertical direction away from the bottom surface of the respective first or second extension member within the first vertical plane.

11. The fish finder device housing of claim 10, wherein the bottom surfaces and the bottom perimeter portions of the first and second extension members define a substantially concave-shaped configuration on a bottom side of each of the first and second extension members.

12. The fish finder device housing of claim 1, wherein the lower shell has a substantially flat bottom surface.

13. The fish finder device housing of claim 1, wherein the upper shell has a protruding portion extending away from the body portion.

14. The fish finder device housing of claim 13, wherein the protruding portion has a substantially cylindrical shape with a rounded top surface.

15. The fish finder device housing of claim 1, wherein the first extension member or the second extension member has an aperture.

16. The fish finder device housing of claim 1, wherein the second extension member has an aperture located between the second keel and a distal end of the second extension member.

17. The fish finder device housing of claim 1, wherein the upper and lower shells have a sealing gasket located there between.

18. The fish finder device housing of claim 1, wherein the watertight shell housing is about 2 to about 3½ inches in diameter, the first extension member is about 1 inch to about 2¼ inches in length, the second extension member is about ½ inch to about 1½ inches in length, the first keel has a longitudinal length of about 1 inch to about 2 inches, the first keel has a depth of about ½ inch to about 1 inch, the second keel has a longitudinal length of about ⅜ inches to about 1¼ inches, and the second keel has a depth of about 3/16 inches to about ¾ inches.

19. A fish finder device housing capable of containing an electronic load having a transducer, the housing comprising:
an upper shell operably connected to a lower shell providing a watertight shell housing having an interior area containing the electronic load having the transducer, and a horizontal plane corresponding to the perimeter where the upper and lower shells are operably connected;
the upper shell having a body portion, a first extension member having a first length, and a second extension member having a second length, wherein the first and second extension members are proximately connected to opposing sides of the body portion and extending away from the body portion and having a distal end, and wherein the first and second extension members have a top surface and a bottom surface;
a first keel located on the bottom surface of the first extension member and located in a vertical plane perpendicular to the horizontal plane, the first keel having a first longitudinal length located between the distal end of the first extension member and the body portion, and the first keel having a first depth extending away from the bottom surface of the first extension member within the vertical plane; and
a second keel located on the bottom surface of the second extension member and located in a vertical plane perpendicular to the horizontal plane, the second keel having a second longitudinal length located between the distal end of the second extension member and the body portion, and the second keel having a second depth extending away from the bottom surface of the second extension member within the vertical plane;
wherein the first longitudinal length of the first keel is greater than the second longitudinal length of the second keel.

20. A fish finder device housing capable of containing an electronic load having a transducer, the housing comprising:
an upper shell operably connected to a lower shell providing a watertight shell housing containing the electronic load having the transducer, and a horizontal plane corresponding to the perimeter where the upper and lower shells are operably connected;
the upper shell having a body portion, a first extension member having a first length, and a second extension member having a second length, wherein the first and second extension members are proximately connected to opposing sides of the body portion and extending away from the body portion and having a distal end, and wherein the first and second extension members have a top surface and a bottom surface;
a first keel located on the bottom surface of the first extension member and located in a vertical plane perpendicular to the horizontal plane, the first keel having a first longitudinal length located between the distal end of the first extension member and the body portion, and the first keel having a first depth extending away from the bottom surface of the first extension member within the vertical plane; and
a second keel located on the bottom surface of the second extension member and located in a vertical plane perpendicular to the horizontal plane, the second keel having a second longitudinal length located between the distal end of the second extension member and the body portion, and the second keel having a second depth extending away from the bottom surface of the second extension member within the vertical plane;
wherein the first depth of the first keel is greater than the second depth of the second keel.

* * * * *